US007481584B2

(12) United States Patent
Cairns

(10) Patent No.: US 7,481,584 B2
(45) Date of Patent: Jan. 27, 2009

(54) DRY MATE CONNECTOR

(75) Inventor: James L. Cairns, Ormond Beach, FL (US)

(73) Assignee: Ocean Design, Inc., Daytona Beach, FL (US)

( * ) Notice: Subject to any disclaimer, the term of this patent is extended or adjusted under 35 U.S.C. 154(b) by 0 days.

(21) Appl. No.: 11/765,920

(22) Filed: Jun. 20, 2007

(65) Prior Publication Data

US 2008/0003868 A1 Jan. 3, 2008

Related U.S. Application Data

(60) Provisional application No. 60/817,826, filed on Jun. 30, 2006.

(51) Int. Cl.
*G02B 6/38* (2006.01)

(52) U.S. Cl. ........................................................ 385/60

(58) Field of Classification Search ................... 385/60, 385/59, 70–72; 439/271–272
See application file for complete search history.

(56) References Cited

U.S. PATENT DOCUMENTS

| | | | | |
|---|---|---|---|---|
| 4,909,751 | A | 3/1990 | Marolda | |
| 4,927,374 | A * | 5/1990 | Batty | 439/310 |
| 5,432,879 | A * | 7/1995 | Lee | 385/60 |
| 5,474,465 | A * | 12/1995 | Kobayashi | 439/278 |
| 5,715,342 | A * | 2/1998 | Nodfelt et al. | 385/61 |
| 5,873,750 | A | 2/1999 | Cairns et al. | |
| 6,332,787 | B1 | 12/2001 | Barlow et al. | |
| 6,439,778 | B1 | 8/2002 | Cairns | |
| 6,910,910 | B2 | 6/2005 | Cairns et al. | |
| 6,962,445 | B2 * | 11/2005 | Zimmel et al. | 385/55 |
| 7,040,909 | B2 * | 5/2006 | Cairns | 439/271 |
| 7,195,505 | B1 * | 3/2007 | Becker | 439/282 |
| 7,264,402 | B2 * | 9/2007 | Theuerkorn et al. | 385/59 |

OTHER PUBLICATIONS

U.S. Appl. No. 11/757,023, Cairns, et al.
U.S. Appl. No. 11/769,911, Cairns.

* cited by examiner

*Primary Examiner*—Jean F Duverne
(74) *Attorney, Agent, or Firm*—Procopio, Cory, Hargreaves & Savitch LLP

(57) ABSTRACT

A dry-mate connector has nipples on the front or mating side of the electrical conductors on both the plug and receptacle units which cooperate with an elastomeric seal on the mating end of one of the units to provide an individual seal around each electrical circuit in the mated condition. In a hybrid version of the connector, an optical contact assembly is provided in each unit which has a multi-fiber ferrule at the mating end of the assembly, allowing a high contact density to be achieved in a relatively small space.

51 Claims, 9 Drawing Sheets

DRY MATE CONNECTOR

RELATED APPLICATION

The present application claims the benefit of U.S. provisional patent application No. 60/817,826 filed Jun. 30, 2006, which is incorporated herein by reference in its entirety.

BACKGROUND

1. Field of the Invention

The present invention relates generally to dry-mate connectors which are intended to be mated in a dry environment and then exposed to a harsh working environment, such as seawater.

2. Related Art

Dry-mate connectors typically consist of plug and receptacle units which, when mated together, form a sealed chamber around the contact elements. The plug unit typically contains a plurality of contact probes or pins to which fiber-optic or electrical leads are terminated. The receptacle unit contains a corresponding number of sockets into whose terminal ends a corresponding number of fiber-optic or electrical leads are terminated. The probes or pins are mated with the sockets when the two units are coupled together.

One type of dry-mate connector comprises rubber plug and receptacle portions which depend on a squeezed interference fit between the plug and receptacle portions to accomplish the seal. They are typically referred to as "interference-fit" connectors and have been in common use for many years. Interference fit connectors are typically not suitable for high reliability applications. Interference fit connectors are used to connect electrical circuits only. Their somewhat deformable bodies do not allow the precise contact alignment required for optical circuits.

Another known dry-mate connector consists of rigid plug and receptacle units that are typically, but not always, formed from metal. Such connectors have been used for more than 50 years. They are typified by MIL-C-24217, a military specification describing the construction of one commonly used electrical connector embodiment. To create the sealed contact chamber, these connectors rely on rubber O-rings that sealably engage as the plug and receptacle portions are mated. These connectors are suitable for both electrical and optical circuits, and for high-reliability applications.

Even the MIL-C type electrical connectors have some operational shortcomings. Often the environment in which they are connected/disconnected is a spray or splash zone, or simply very humid. If even a single droplet of water or a bit of dampness enters the contact area prior to complete engagement, the connector fails electrically. These connectors have no internal protection that prevents contact-to-contact or contact-to-shell electrical shorting in such circumstances.

Attempts have been made to provide internal protection on already-manufactured connectors by inserting a secondary gasket seal between the mating faces of the connector halves. Such an arrangement is proposed in U.S. Pat. No. 4,909,751 of Marolda, for example. These rigid body dry-mate connectors, however, are not manufactured with surfaces that can be easily or reliably sealed with such gaskets. In any case, the gaskets themselves are susceptible to dampness. So the secondary gasket seal does not completely address the problem.

There are existing dry mate connectors of the rigid body type that are capable of carrying optical circuits, for example as described in U.S. Pat. No. 5,873,750 of Cairns et al. In such connectors, the optical contacts consist of single-circuit straight-termination type ferrules. Because each optical contact within these connectors requires its individual, respective ferrule, the number of optical circuits in any one connector is limited. All dry-mate connectors of this sort have used individual ferrules to align the optical circuits, leading to increased complexity, large connector size and high cost as optical channel count grows.

SUMMARY

Embodiments described herein provide a new dry-mate connector which is relatively or completely insensitive to pre-mating dampness or humidity. Embodiments described herein also provide a dry-mate hybrid or optical connector with relatively high optical-circuit density.

According to one aspect of the present invention, a dry-mate connector is provided which comprises a plug unit and a receptacle unit which are releasably mateable together. The plug unit contains one or a plurality of electrical and/or optical circuits which terminate in contacts. The receptacle unit contains a corresponding number of electrical and/or optical circuits which terminate in contacts which are mated with the contacts in the receptacle unit when the two units are mated. The connector may be electrical only, optical only, or may be a hybrid electrical and optical connector. The electrical contacts may be mateable probes and sockets.

In an all-electrical or hybrid connector, individual elastomeric seals engage over nipples at the base of each electrical circuit contact to provide isolation in the mated condition in the event that moisture enters the housing prior to mating. In an all-optical or hybrid connector, each unit has a multiple fiber ferrule at its front or mating end and multiple fibers terminate to optical contacts in a mating end face of each ferrule. The fibers may be configured as a multi-fiber ribbon. In one embodiment of the hybrid connector, the optical contact assembly may be provided through the center of each of the units with the electrical contact assemblies located in a ring around the optical contact assembly.

The design enhances the state of the art by improving reliability and by addressing issues with currently available dry mate connectors such as high manufacturing cost, poor electrical isolation, low optical circuit density and relatively large size.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a dry-mate connector for simultaneously joining multiple electrical and/or optical circuits in a dry environment before immersing the connector in a harsh environment such as deep ocean depths.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 3:
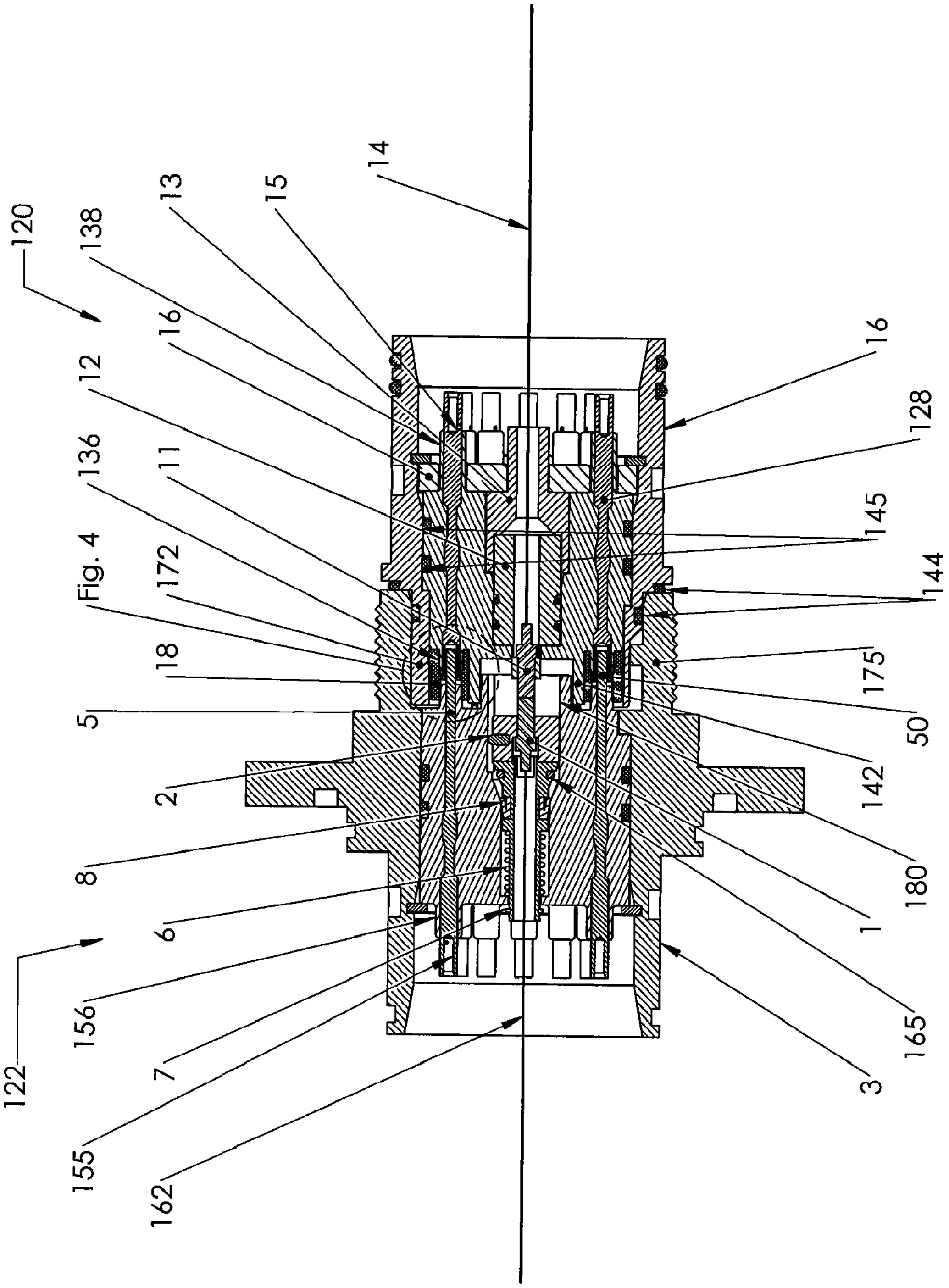
FIG. 3 is a longitudinal cross-sectional view similar to FIG. 2 but illustrating the plug and receptacle units in the mated condition.
Figure 4:
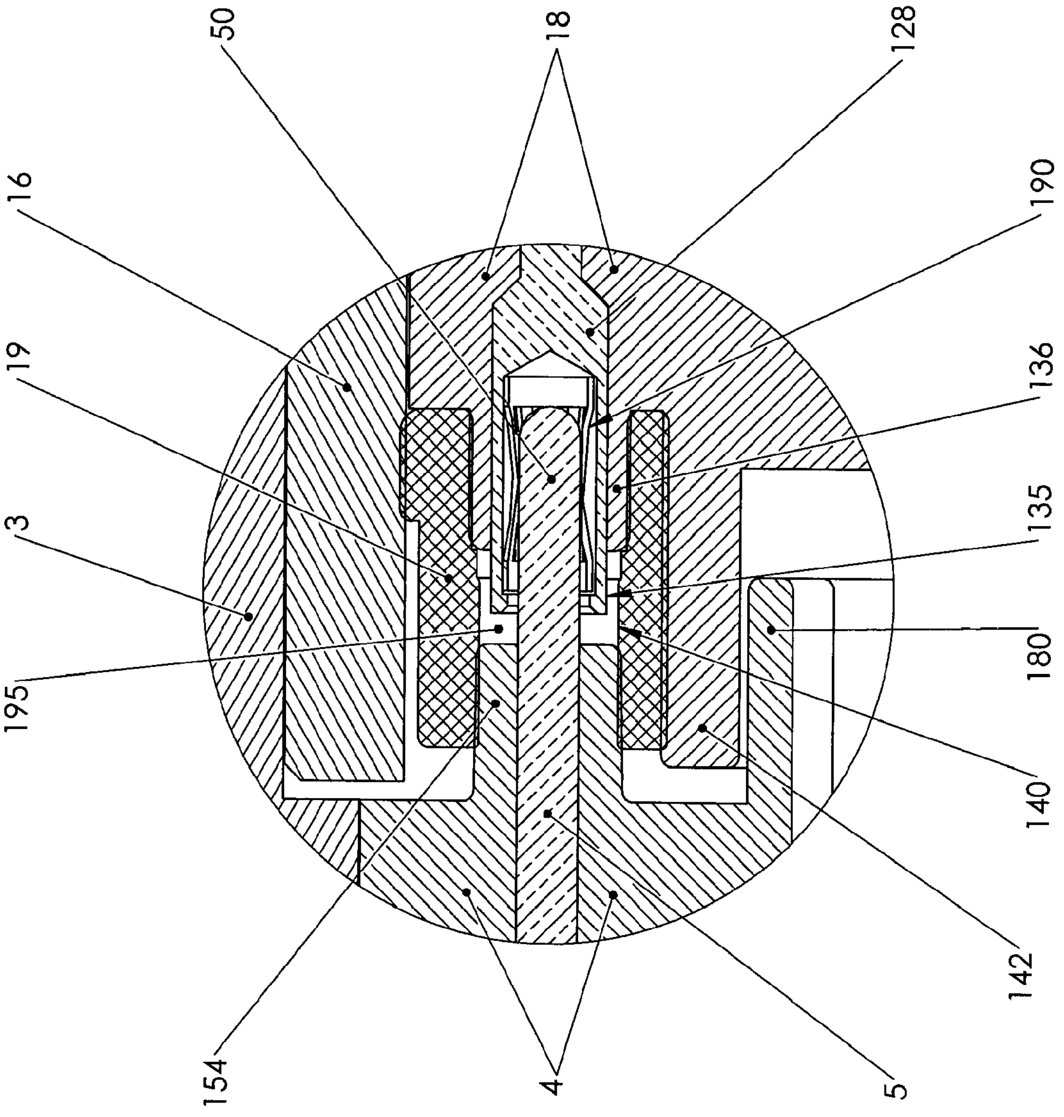
FIG. 4 is an enlarged view of the circled area of FIG. 3 illustrating the electrical contacts and seal arrangement in more detail.
Figure 5:
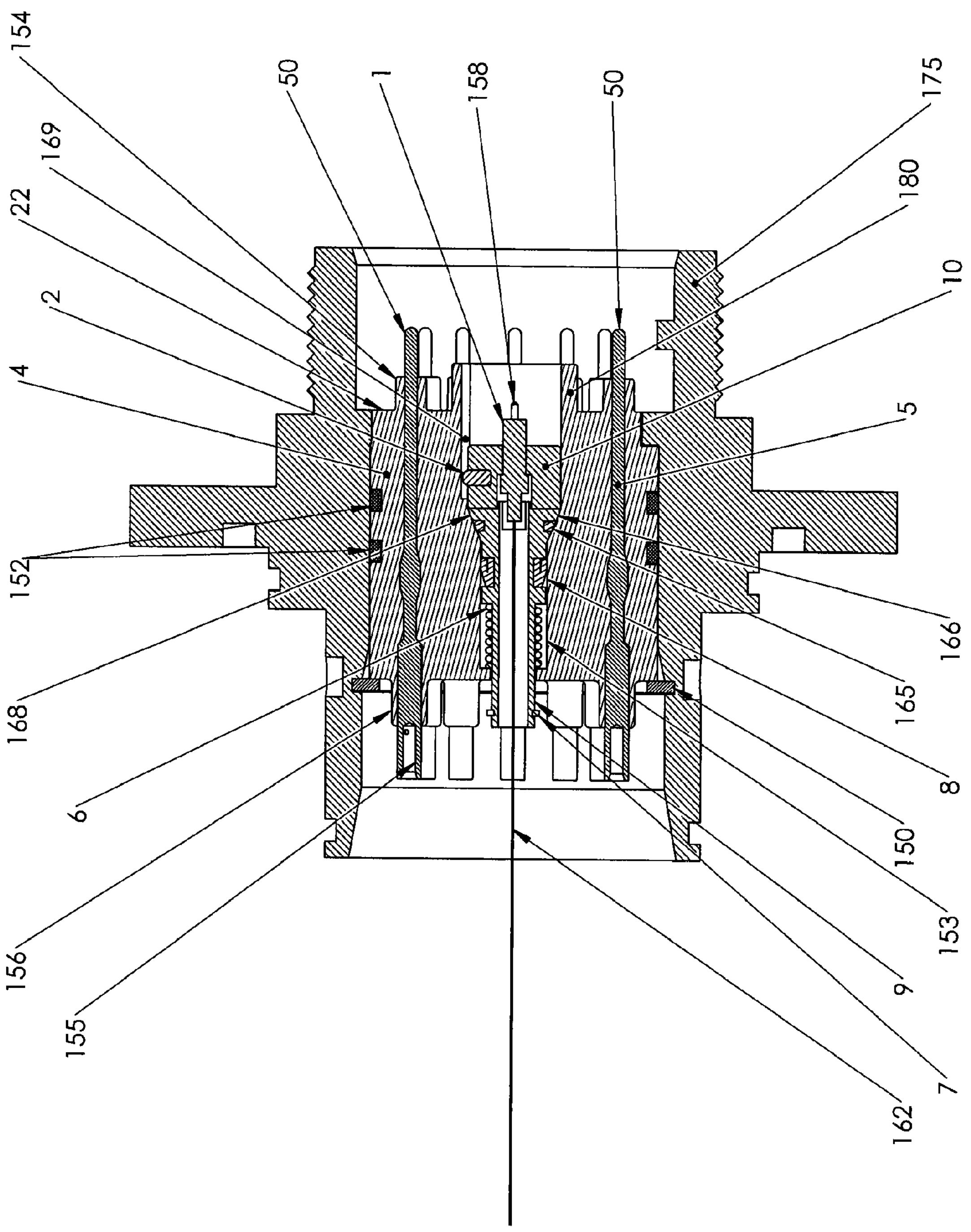
FIG. 5 is a longitudinal cross-sectional view of the receptacle unit of FIGS. 1 to 4 in an unmated condition but with external pressure forcing the activation of the secondary seal.
Figure 6B:
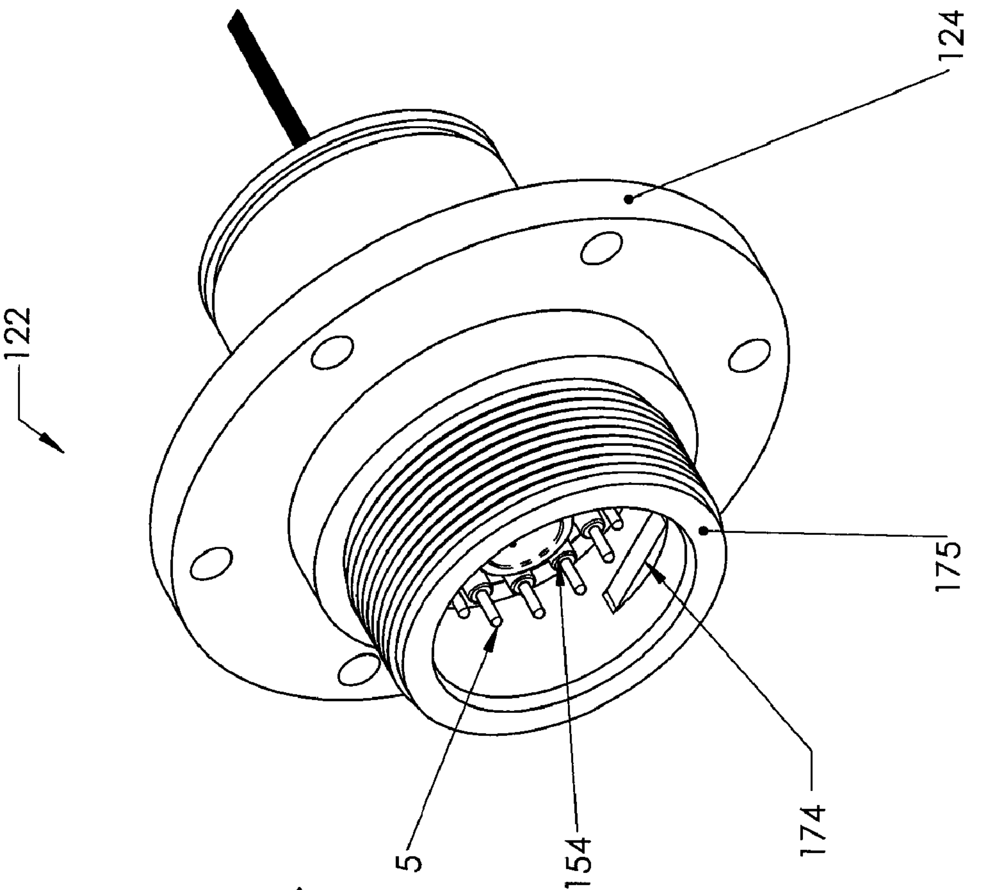
FIG. 6B is a front perspective view of a receptacle unit with an alignment feature for keying with the plug alignment feature of FIG. 6A.
Figure 6A:
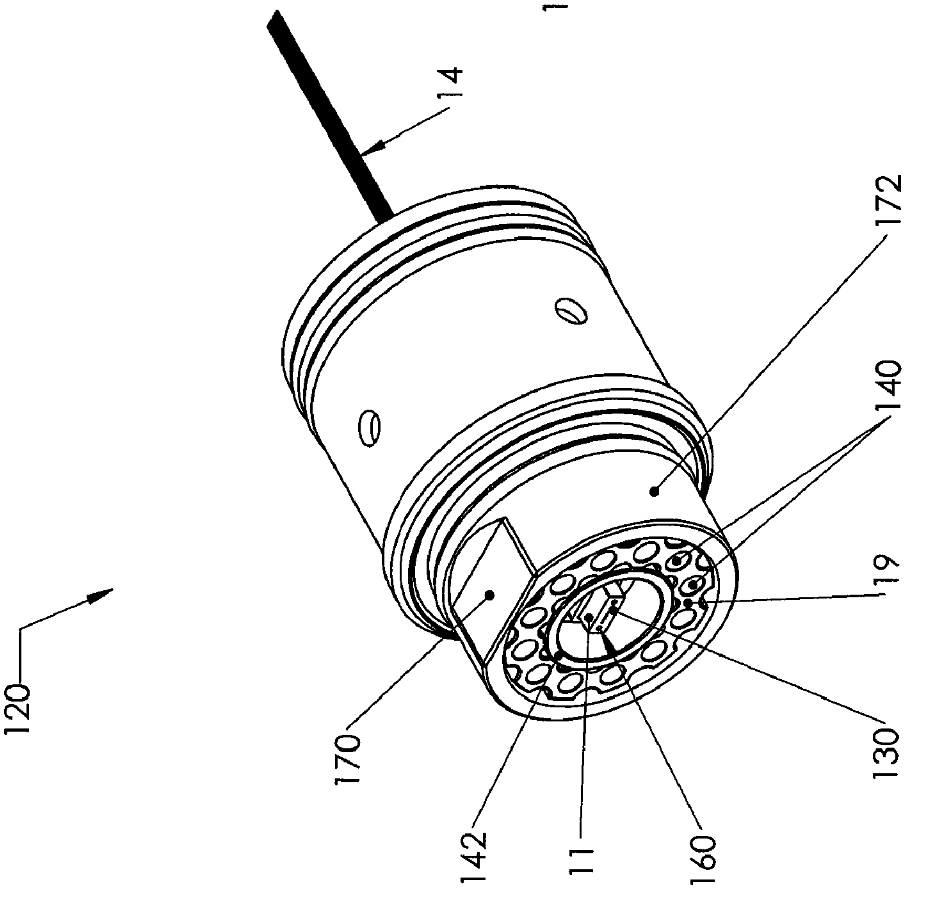
FIG. 6A is a front perspective view of the plug unit of FIGS. 1 to 4 with an alignment or anti-rotation keying feature.
Figure 7:
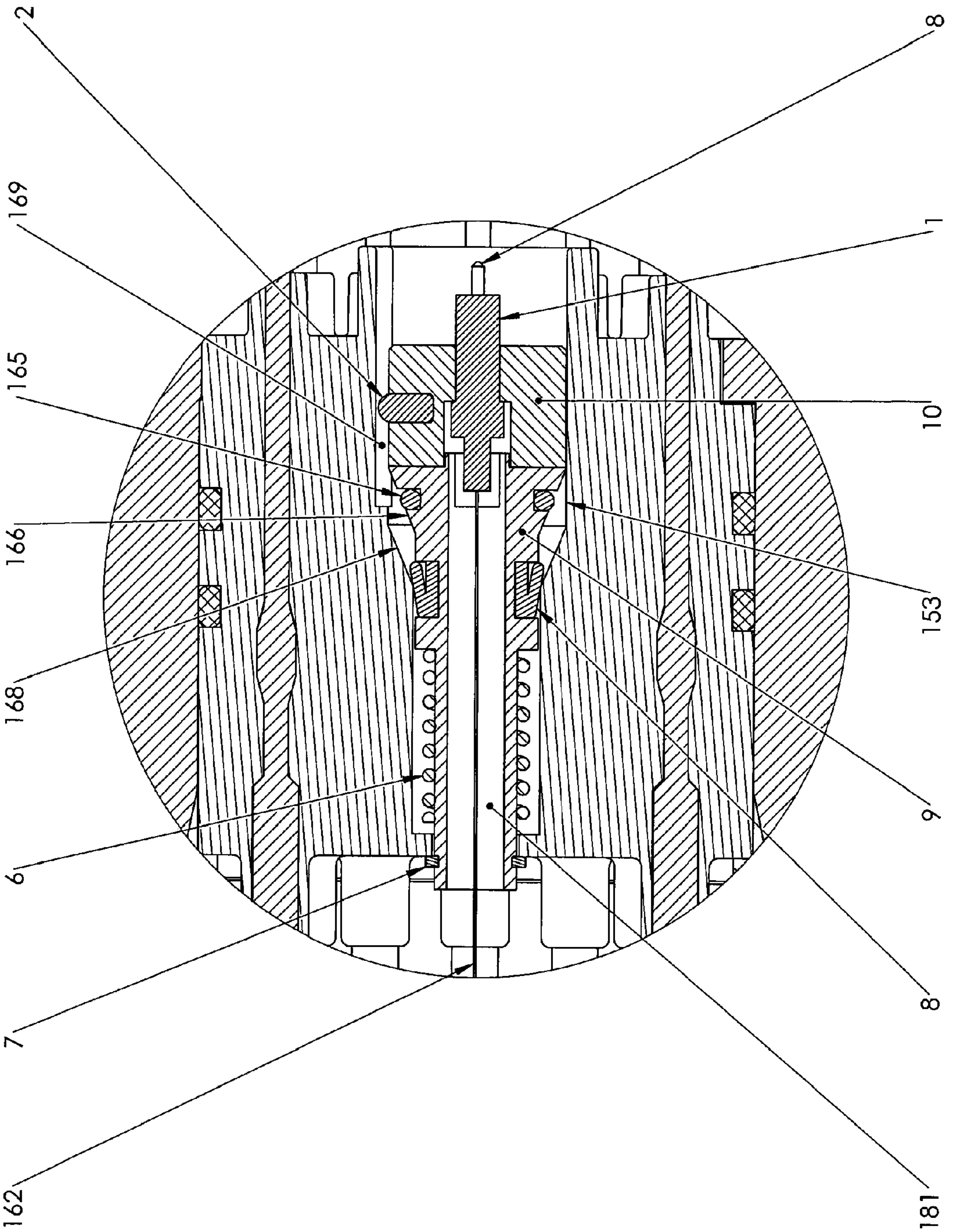
FIG. 7 is an enlarged view of the optical sub-assembly in an un-mated condition.
Figure 8:
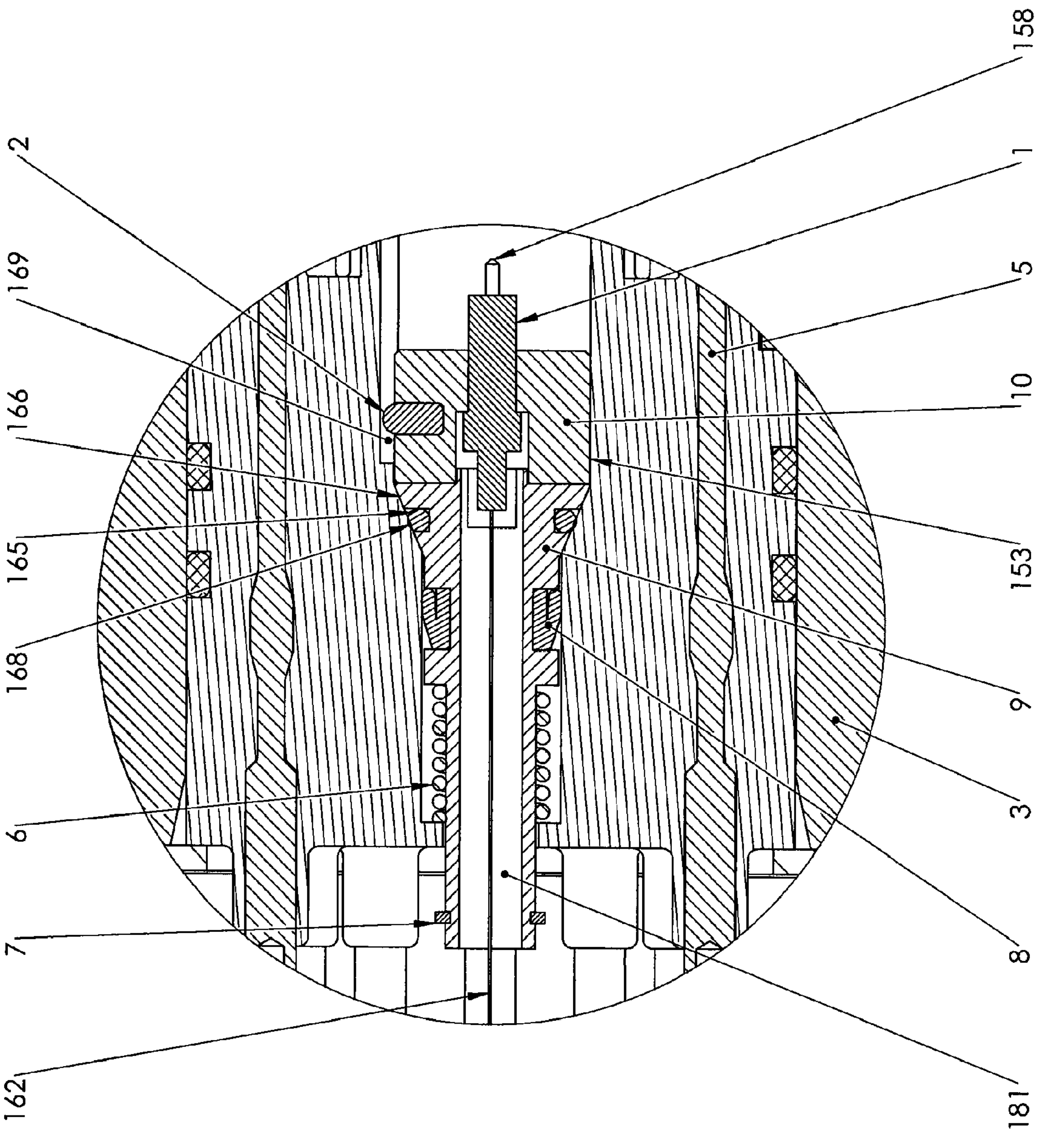
FIG. 8 is an enlarged view of the optical sub-assembly in an unmated condition but with external pressure forcing the activation of the secondary seal.

FIGS. 1 to 4 illustrate a dry-mate hybrid or electro-optical connector 100 according to one embodiment, while FIGS. 5, 7, and 8 illustrate one part of the connector in more detail and FIGS. 6A and 6B illustrate one possible alignment mechanism for use in mating the two parts of the connector 100, as described in more detail below.

Connector 100 has first and second connector units designed for releasable mating engagement. In the illustrated embodiment, one of the connector units comprises a plug unit 120 having a rear end 121 configured for connection to an end of an electro-optical cable and the other connector unit comprises a receptacle unit 122 for releasable mating engagement with plug unit 120. An outer coupling sleeve (not illustrated) may be used to hold the plug and receptacle units together in the mated condition. Many other means could be envisioned for retaining the two connector halves in mated engagement. Receptacle unit 122 has a bulkhead mounting flange 124 in the illustrated embodiment, although this may be eliminated in alternative embodiments where the connector is not intended to extend circuits into a bulkhead.

Figure 1:
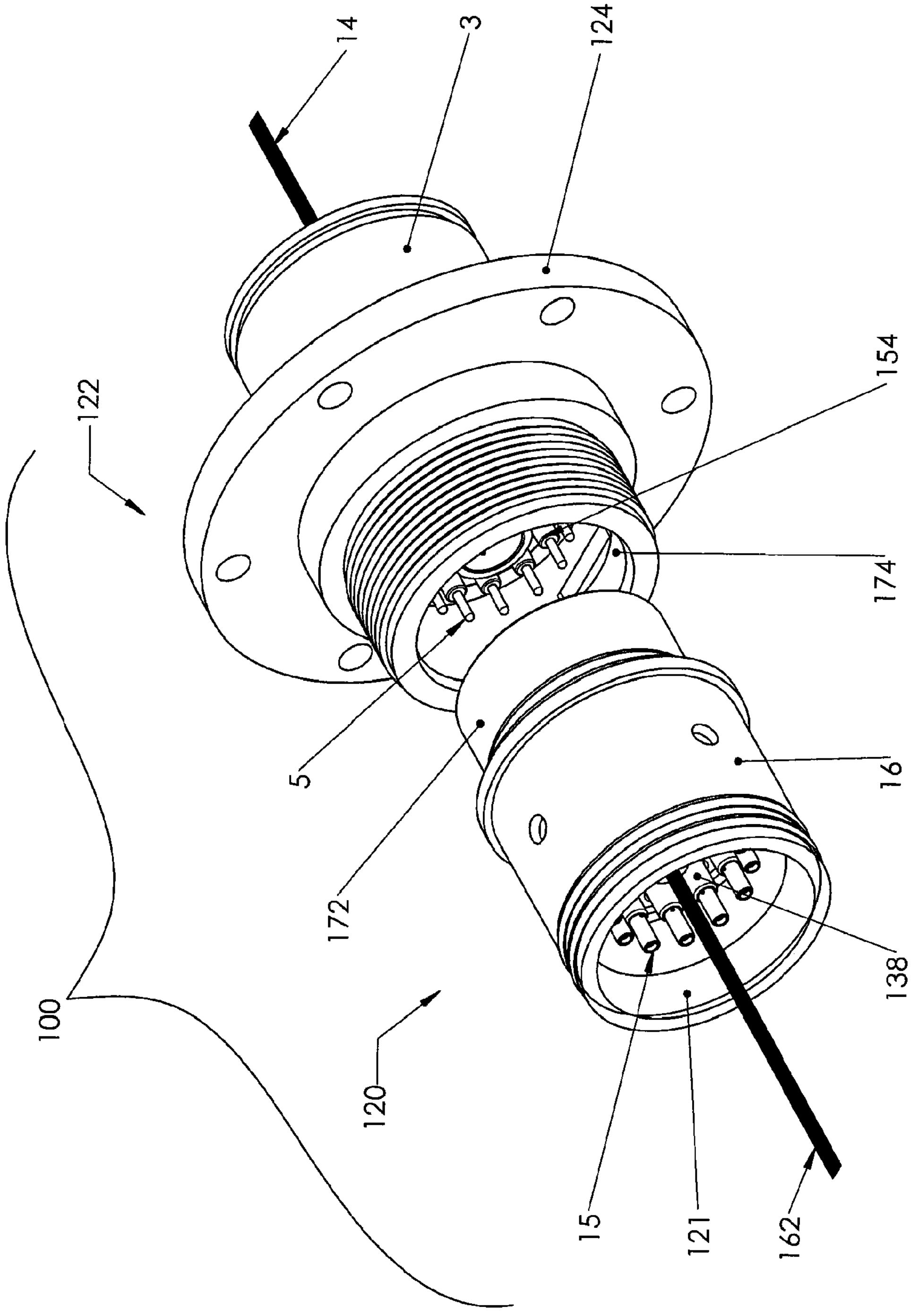
FIG. 1 is a perspective view of a dry-mate hybrid connector according to one embodiment of the invention, with the plug and receptacle units separated in an unmated condition but aligned in position for mating engagement.
Figure 2:
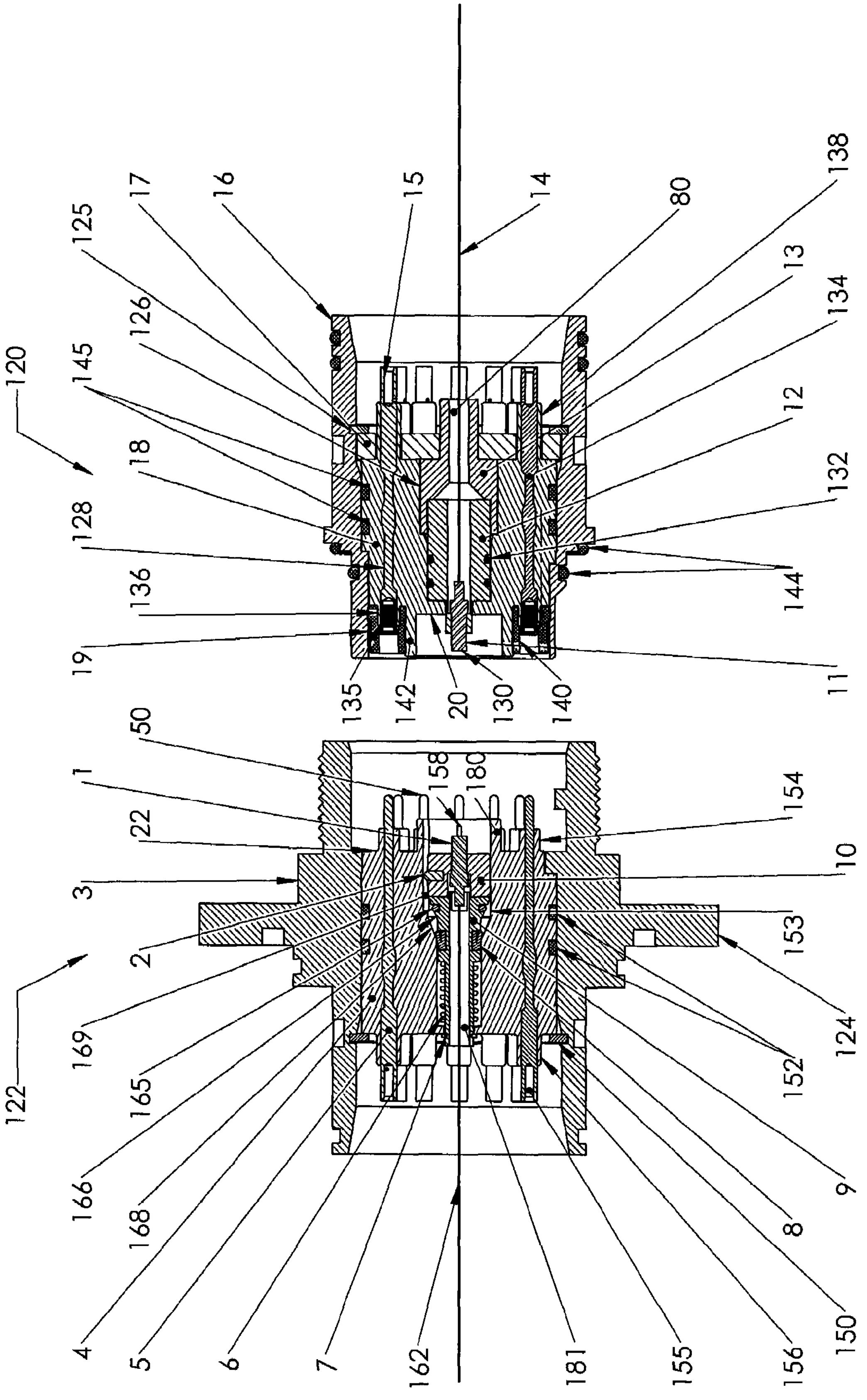
FIG. 2 a longitudinal cross-sectional view of the plug and receptacle units of FIG. 1 in the unmated condition.

As illustrated in FIG. 2, the plug unit 120 comprises an outer shell or housing 16 in which an insert or contact housing body 18 of dielectric or molded plastic material is mounted. Although the outer shell and body 18 are formed separately in the illustrated embodiment, they may be formed integrally in alternative embodiments. The body 18 is held in fixed position between a shoulder in shell 16 and a retaining back plate 17 which is held in position by snap-ring 125, and has a forward end face 20 which faces the receptacle unit in the mating position of FIG. 2. Body 18 has a central through bore 126 aligned with an opening in back plate 17. An optical contact assembly is mounted in the central through bore 126, and a plurality of spaced electrical contact assemblies project through the body 18 and out of the forward end face of the body in a ring around the optical contact assembly. In the illustrated embodiment, each electrical contact assembly comprises a single electrical conductor 134, and the rear ends of the conductors extend from the insert through aligned openings in the back plate. In the illustrated embodiment, the electrical conductors 134 are molded into the dielectric body 18. In an alternative embodiment, pre-formed bores for receiving the electrical conductors may be provided in the body 18, with suitable modification to the mating surfaces of the bores and conductors to allow insertion of the conductors through the bores.

As best illustrated in FIGS. 2 and 6A, in one embodiment of the plug unit the optical contact assembly comprises a female multi-fiber ferrule 11 mounted in the open front end of through bore 126, a two part ferrule housing 12, 13 extending from ferrule 11 through the bore 126 and aligned opening in the back plate 17, and an optical ribbon fiber 14 extending from the rear end of the plug unit through ferrule housing 12, 13 to ferrule 11. The ferrule housing has a through bore 80 through which ribbon fiber 14 extends. The multi-fiber ferrule 11 has a plurality of optical contacts in its front end face 130, and each fiber in ribbon fiber 14 is terminated at a respective optical contact face. The multi-fiber ferrule 11 and ribbon fiber 14 are assembled together with ferrule housing 12, 13 using a potting or adhesive compound to seal the ferrule to the ferrule housing central through bore 80. O-ring seals 132 are mounted in grooves on the outer surface of the front part 12 of the ferrule housing for sealing engagement with the through bore 126 in insert 18.

Each electrical conductor 134 has an electrical contact or socket 135 formed at its forward end. The socket may be of any type. In the illustrated embodiment, a contact band 190 is mounted in socket 135, as illustrated in more detail in FIG. 4. Alternatively, a crimped socket, slotted socket, or similar contact socket may be used without contact band 190. A dielectric nipple 136 projects from the forward end face of body 18 to surround the base of each socket 135. Electrical sockets 15 at the rear ends of the conductors 134 project outwardly from the back plate 17 for connection to electrical leads in a cable end terminated to the plug unit, and have dielectric boot seal nipples 138 at their bases for engagement with boot seals (not shown) for sealing onto insulated conductors.

A seal assembly comprising an annular seal or ring 19 of elastomeric material is mounted in the forward open end of the plug unit adjacent the forward end face of the contact housing body 18, and has spaced seal openings 140 aligned with the respective electrical contact sockets. As illustrated in FIGS. 2, 4 and 6A, each seal opening engages over the respective electrical contact socket 135 and seals against the dielectric nipple 136 surrounding the base of the electrical contact socket, and the seal 19 is seated in an annular mounting groove defined between the forward end of shell 16 and an annular projection or ring 142 which extends from the forward end face of body 18 and surrounds the optical ferrule 11. The combination of the nipple and annular elastomeric seal effectively forms a sealed space around each pin/socket junction when the plug and receptacle units are mated, as described in more detail below and illustrated in FIGS. 3 and 4, combining two different types of sealed junction into a single connector.

External O-ring seals 144 are provided on plug shell 16 for sealing engagement with the receptacle shell when the plug and receptacle units are mated, as discussed in more detail below. O-ring seals 145 are also located between the body 18 and the inner surface of plug shell 16, as seen in FIGS. 2 and 3.

The receptacle unit 122 is illustrated in FIGS. 1 to 5 and 6B and basically comprises an outer shell 3 in which an insert or contact housing body 4 of dielectric or molded plastic material is mounted. Although the outer shell and body 4 are formed separately in the illustrated embodiment, they may be formed integrally in alternative embodiments. In the illustrated embodiment, body 4 is secured between an internal shoulder of the shell through bore and a retaining snap ring 150, and O-ring seals 152 are mounted between the outer surface of body 4 and the inner surface of the shell through bore. Body 4 has a forward end face 22 which is recessed inwardly from the open forward end of the outer shell 3, as illustrated in FIG. 2. An optical contact sub-assembly is movably mounted in a central through bore 153 extending through body 4, and a plurality of spaced electrical conductors 5 extend through body 4 and terminate in pins or contact probes 50 which project out through the forward end face 22 of the body and surround the central optical contact assembly. In one embodiment, the conductors 5 are molded into the dielectric base or insert 4. The contact pins 50 project forwardly from the front end face of the body 4 for mating engagement in the electrical contact sockets 135 of the plug unit. Dielectric nipples 154 project from the front end face 22 of body 4 to surround the base of the forwardly projecting portion of each contact pin 50. As in the plug unit, conductors 5 have sockets or solder pots 155 at their rear ends with dielectric boot seal nipples 156 at their bases.

The optical contact sub-assembly of the receptacle unit is illustrated in more detail in FIGS. 7 and 8, and has a two part ferrule housing 9,10 having a through bore 181 and a multi-fiber male ferrule 1 mounted at the front end of the ferrule housing through bore and projecting forwardly from the housing. Although the ferrule in the plug unit is the female ferrule and the ferrule 1 in the receptacle unit is the male ferrule in the embodiment described herein, it will be understood that these ferrules may be reversed in alternative embodiments, with ferrule 1 comprising a female ferrule and ferrule 11 comprising a male ferrule. The ferrule 1 has alignment pins 158 which are adapted to engage in corresponding alignment sockets 160 in the female ferrule 11 (see FIG. 6A), in a known manner for multiple fiber ferrules in other connector arrangements. An optical ribbon fiber 162 extends from the rear end of the receptacle unit through ferrule housing 9,10 to ferrule 1. As in the case on the plug side, the multi-fiber ferrule 1 and ribbon 162 are assembled together with ferrule housing 9,10 using a potting or adhesive compound to seal the ferrule housing central through bore 181. The multi-fiber ferrule 1 has a plurality of optical contacts in its front end face, and each fiber in ribbon 162 extends into the ferrule and is terminated at a respective optical contact. An annular projection or ring 180 extends from the forward end face of body 4 and surrounds the optical ferrule 1.

As noted above, the ferrule housing 9,10 is loosely seated in through bore 153 and is biased by ferrule preload spring 6 into the extended, preload or unmated position of FIGS. 2 and 7. Spring 6 is mounted between a shoulder or stop at the rear end of bore 153 and a shoulder or abutment on the rear part of the ferrule housing 9. A retaining ring 7 is mounted at the rear end of rear part 9 of the ferrule housing and is biased by spring 6 against the rear end of the body 4.

A ferrule lip seal 8 is mounted in an annular recess on the outer surface of ferrule housing 9 for sealing engagement with the opposing inner surface of insert through bore 153, as best illustrated in FIG. 7. Both the through bore 153 of the body 4 and the outer surface of ferrule housing 9 are of stepped diameter, with matching part-conical faces 168, 166 at the step in diameter, as seen in FIG. 7. An O-ring back-up seal 165 is mounted at the conically shaped portion or face 166 of the ferrule housing 9, opposing the similarly conically shaped portion 168 of the insert through bore 153. The conically shaped faces are spaced apart when the optical contact housing is in the extended position of FIG. 7. With this arrangement, the optical ferrule 1 is moved rearwardly a small distance on mating engagement with the female ferrule 11 of the plug unit, as illustrated in FIG. 3, compressing spring 6 and ensuring that the optical contacts are in good optical engagement. An anti-rotation pin 2 projects outwardly from the forward part 10 of the ferrule housing into an alignment groove 169 on the inner face of through bore 153, ensuring that the ferrule contacts remain in alignment during mating of the plug and receptacle units. The conically shaped faces are still spaced a small distance apart in the mated condition of FIG. 3, and are designed not to meet in normal operation of the connector. The back-up seal is designed only to come into play if the receptacle unit is exposed to pressure in an unmated condition, as described below in connection with FIG. 8.

FIG. 8 illustrates the receptacle unit in an unmated, non-operating condition resulting from the ferrule housing being improperly exposed to external pressure. In FIG. 8, external pressure has activated the secondary seal by forcing the ferrule housing 9 to move rearwards until the opposing conical faces 166, 168 are in face-to-face engagement with the O-ring 165 forming a seal between the opposing faces. Although the opposing faces 166, 168 of the through bore 153 and ferrule housing 9 at the step in diameter are part-conical in the illustrated embodiment, they may be opposing flat surfaces at the step in diameter in other embodiments.

In one embodiment, an alignment or keying mechanism comprises a flat 170 on the outer surface of the reduced diameter front or mating end portion 172 of the plug unit, and a corresponding flat 174 on the inner surface of the front end portion 175 of the receptacle unit, as best illustrated in FIGS. 6A and 6B. With this arrangement, the end portion 172 of the plug unit can only be inserted into the front end portion 175 of the receptacle unit when the flat 170 is aligned with the corresponding flat 174. In FIGS. 6A and 6B the flats 172 and 174 are shown rotated 180 degrees out of alignment for illustrative purposes. The flats are aligned in order to allow the plug and receptacle units to be moved into mating engagement. Other alternative keying or alignment mechanisms may be used in alternative embodiments.

FIGS. 3 and 4 illustrate the plug and receptacle units in a fully mated condition. In order to mate the plug and receptacle units, they are positioned in alignment as in FIG. 1 and moved towards one another so that the front end portion 172 of the plug unit enters the open front end or cavity 174 of the receptacle unit. Although the front end portion 172 of the plug unit and the corresponding front end cavity or bore 174 of the receptacle unit are of mating circular cross-section in the illustrated embodiment, they may be of alternative, mating non-circular cross-sections in other embodiments. As the plug and receptacle units continue to move into engagement, the projecting annular portion or ring 180 of the dielectric body 4 in the receptacle unit engages in the corresponding projecting annular portion 142 of the plug dielectric body 18. Again, these portions may be of mating, non-circular cross-sections such as square, rectangular, polygonal or the like in other embodiments. As the portion 180 engages in hollow portion 142, electrical contact pins 50 also enter seal bores 140 and engage in the electrical sockets 135 of the plug unit. The front end of the female optical ferrule 11 engages the front end face of the male ferrule 1, and the optical contact assembly in the receptacle unit moves aft or rearward as the preload spring 6 is compressed, simultaneously moving the retaining ring 7 from the rear end face of body 4, as can be seen in FIG. 3. This helps to maintain optical contact and communication between the optical contacts in the front end faces of ferrules 1 and 11. The lip seal 8 is designed to accommodate the slight rearward movement of the optical ferrule housing 9,10 while maintaining good sealing engagement with the opposing surface of through bore 153. It also allows adjustment of tilt, axial alignment and rotation of the ferrule housing 9,10 on which it is mounted. An external seal is provided by the O-ring seals 144 on plug unit 120 engaging the outer surface of the front end portion 175 of the receptacle unit when the units are fully mated.

The O-ring seal 165 mounted in a conical face portion of the optical ferrule housing 9 provides a back up seal in the event that the bulkhead ferrule assembly is exposed to high pressure, for example if the receptacle or bulkhead unit 122 is submerged un-mated or if the external shell-to-shell O-ring seals 144 fail. FIGS. 5 and 8 illustrate the position of the ferrule assembly if external pressure is applied to the front end of the receptacle unit 122 in the unmated condition. In this case, the external pressure acting on seal 8 forces the ferrule housing rearwards until the conical face portion 166 of the housing engages the corresponding conical face portion 168 of the through bore, with the back-up O-ring 165 in sealing engagement between the opposing faces. Mounting the O-ring seal 165 on the conical seat provides the same advantages as a regular face-seal O-ring, but it provides improved distribution of stresses on the sealed part. The arrangement of the lip seal 8 backed up by the conical face mounted O-ring seal 165 provides a loosely seated yet high pressure sealed mounting of the ferrule. Although this sealing arrangement is used with a multi-fiber ferrule in the illustrated embodiment, a similar loosely seated mount and sealing arrangement may also be used with single fiber ferrules.

By providing dielectric nipples on the front (mating) side of the electrical conductors on both the plug and receptacle units, the electrical trace path between the circuits may be lengthened. The annular elastomeric seal 19 with sealing bores or openings 140 provides individual elastomeric seals over the nipples 136, 154 for each electrical circuit, as can be seen in FIGS. 3 and 4. As best illustrated in FIG. 4, the nipple 154 of each contact pin or probe 50 in the receptacle unit engages in the front end of the respective aligned bore 140 in seal 19 in the mated condition. This provides isolation in the mated condition in the event that moisture enters the housing prior to mating. Although the seal 19 is provided in the mating end face of the plug unit in the illustrated embodiment, it may alternatively provided in the mating end face of the receptacle unit in alternative embodiments. The combination of the nipples and annular elastomeric seal effectively forms a sealed space 195 around each pin/socket junction when the plug and socket units are mated, combining two different types of sealed junction into a single connector. The nipples, in cooperation with seal 19, provide individual sealing of each mated pin/socket. Thus, these connectors may be mated in the presence of splashed water or dampness with little or no degradation of the electrical performance. This is not possible with conventional dry-mate connectors.

Figure 9:
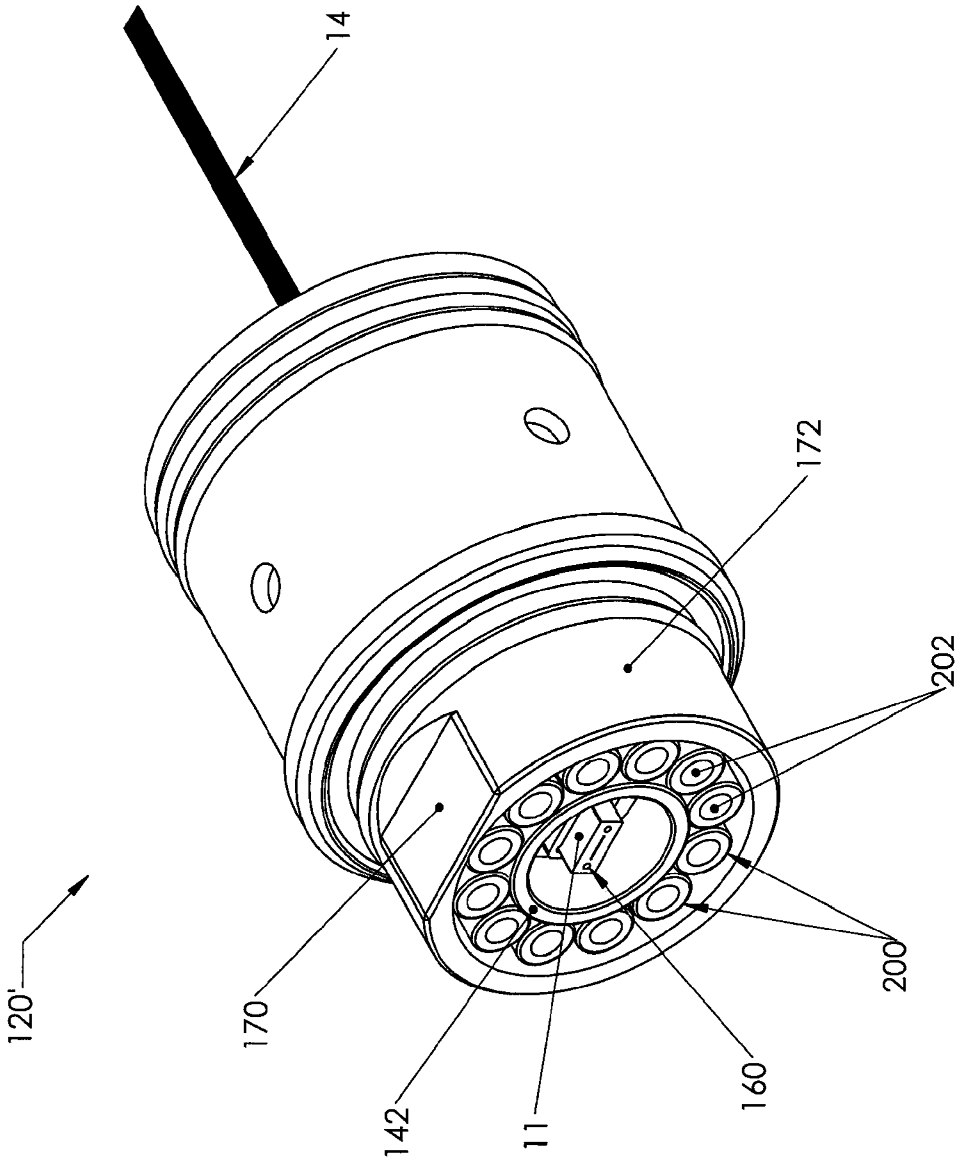
FIG. 9 is a front perspective view of another embodiment of the plug unit with a modified electrical contact seal arrangement.

FIG. 9 illustrates an alternative plug unit 120' for use in another embodiment of the connector. In this embodiment, the plug unit has a modified seal assembly for the electrical contact junctions, but is otherwise identical to the plug unit 120 in the previous embodiment, and like reference numerals have been used for like parts as appropriate. The receptacle unit in this embodiment is identical to the receptacle unit 122 of the previous embodiment. In the embodiment of FIGS. 1 to 8, the electrical contact seal assembly is an annular or ring-shaped elastomeric seal 19 which has bores which engage over the individual electrical contact nipples in the plug unit, as in FIGS. 3 and 4, forming a sealed space around each electrical contact junction. In the embodiment of FIG. 9, the annular ring seal 19 is eliminated. Instead, the electrical contact seal assembly comprises a plurality of individual sleeve-like seals or boot seals 200, each boot seal 200 having a through bore 202 with an inner end engaged over the nipple 136 of a respective electrical contact socket in the plug unit, in a similar manner to that illustrated in FIG. 4 for the sealing ring bores 140. When the plug unit 120' and the receptacle unit 122 are engaged, the contact probes 50 enter the outer ends of the respective boot seals 200 and move into engagement with the respective contact sockets. At the same time, the nipple 154 of each contact pin or probe engages in the front end of the bore 202 in the respective boot seal 200, providing an individual sealed space around each pin/socket or contact junction.

The arrangement of a multi-fiber ferrule in each connector unit along with a surrounding ring of individual electrical contacts in the above embodiments provides a compact dry-mate hybrid connector with a high channel count in a relatively small package. The illustrated embodiments use state-of-the art multiple fiber ferrules for the optical contact assemblies, permitting tens of optical circuits to be housed in the space traditionally occupied by a single optical circuit.

Although the illustrated embodiment is a hybrid connector, electrical or optical-only connectors may be provided in alternative embodiments. In one embodiment, a dry-mate optical connector has plug and receptacle units containing the central optical portions only of each unit 120, 122. In another embodiment, a dry-mate electrical connector contains the electrical conductor or circuit portions only of each unit 120, 122, eliminating the central optical contact assemblies and optionally replacing these assemblies with additional electrical contacts. In the latter case, elastomeric seal 19 is provided with additional bores or openings 140 aligned with the respective contacts.

The dry-mate connector of the above embodiments provides internal and external seals to provide sealing engagement in the mated condition. External O-ring seals 144 provide first and second seals against external pressure conditions surrounding the connector. Additional internal seals 145, 152 are provided between each insert or contact housing body and the connector shell through bore, and seals 132 are provided between the optical ferrule housing 12 and the insert through bore 126 of the plug unit 120. The electrical contacts are molded into the dielectric inserts. A lip seal 8 and a back up or secondary O-ring seal 165 are provided between the loosely seated optical contact assembly in the receptacle unit 122 and the through bore in which it is mounted, with a conical seating face for the back up seal to provide distribution of the stresses on the sealed part in the event that the connector part is exposed to pressure in the unmated condition, or the external O-ring seals 144 fail.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A connector apparatus, comprising:

a first connector unit having a rear end, a forward end, and a first contact housing body with a forward end face;

a second connector unit releasably mateable with the first connector unit and having a rear end, a forward end, and a second contact housing body with a forward end face;

one of the connector units having a cavity extending from the forward end and the other connector unit having a forward end portion which engages in the cavity in a mated condition of the units;

each contact housing body having at least one forwardly facing contact for communication with a respective at least one contact of the other contact housing body to form at least one contact junction in the mated condition;

an elastomeric seal assembly in the first connector unit at the forward end of the contact housing body, the elastomeric seal assembly having a through bore aligned with the at least one forwardly facing contact of the first connector unit;

the forward end face of each contact housing body having an annular projection which surrounds the at least one respective contact, the annular projection on the first contact housing body extending into an inner end of the through bore in the elastomeric seal assembly and being in sealing engagement with said through bore.

2. The apparatus of claim 1, wherein the annular projection on the forward end face of the second contact housing body extends into and seals with the forward end of the through bore in the elastomeric seal assembly in the mated condition of the units, whereby a sealed space is formed around the contact junction in the mated condition.

3. The apparatus of claim 2, wherein one of the contacts is an electrical socket contact and the other contact is an electrical probe contact, each contact projecting from the forward face of the respective contact housing body, each annular projection comprises a nipple surrounding a base portion of the respective contact, and the nipples are in sealing engagement with respective opposite ends of the through bore of the elastomeric seal in the mated condition.

4. A connector apparatus, comprising:

a first connector unit having a rear end, a forward end, and a first contact housing body with a forward end face;

a second connector unit releasably mateable with the first connector unit and having a rear end, a forward end, and a second contact housing body with a forward end face;

one of the connector units having a cavity extending from the forward end and the other connector unit having a forward end portion which engages in the cavity in a mated condition of the units;

each contact housing body having at least one forwardly facing contact for communication with a respective at least one contact of the other contact housing body to form at least one contact junction in the mated condition;

an elastomeric seal assembly in the first connector unit having a through bore aligned with the at least one forwardly facing contact of the first connector unit;

the forward end face of each contact housing body having an annular projection which surrounds the at least one respective contact, the annular projection on the first contact housing body extending into an inner end of the through bore in the elastomeric seal assembly and being in sealing engagement with said through bore; and each contact housing body having a plurality of forwardly facing contacts for alignment with the forwardly facing contacts in the other contact housing body, each contact housing body having a plurality of annular projections in its forward end face each surrounding a base portion of a respective contact, the elastomeric seal assembly having a plurality of through bores in sealing engagement with the annular projections of the first contact housing body, and the annular projections of the second contact housing body are in sealing engagement in the forward end of the aligned through bores of the elastomeric seal assembly in the mated condition of the connector units, whereby a separate sealed space is formed around each respective contact junction.

5. The apparatus of claim 4, wherein the elastomeric seal assembly comprises a single seal member having a plurality of through bores.

6. The apparatus of claim 5, wherein the seal member is ring-shaped with a central opening and the through bores are formed through the ring portion of the seal member.

7. The apparatus of claim 4, wherein the elastomeric seal assembly comprises a plurality of separate, sleeve-shaped seal members each engaged over a respective annular projection of the first contact housing body and receiving the aligned annular projection of the second contact housing body in the mated condition.

8. The apparatus of claim 4, wherein each connector unit has a central longitudinal axis, the contacts in each contact housing body comprise a plurality of electrical contacts arranged in a ring around the central axis, each connector unit further comprising an optical contact arranged at the center of the electrical contact ring, the through bores in the elastomeric seal assembly being arranged in a ring around the optical contact and aligned with the respective electrical contacts.

9. The apparatus of claim 8, wherein each contact housing body has a central hollow projection at the forward end surrounding the optical contact, the elastomeric seal assembly surrounding the central hollow projection of the first contact housing body.

10. The apparatus of claim 9, wherein the elastomeric seal assembly comprises a single, ring-shaped seal member having a central opening engaged over the central hollow projection.

11. The apparatus of claim 9, wherein the elastomeric seal assembly comprises a plurality of individual sleeve-like seal members arranged in a ring around the central hollow projection.

12. The apparatus of claim 9, wherein the central hollow projection in the second contact housing body engages inside the central hollow projection of the first contact housing body in the mated condition of the connector units.

13. The apparatus of claim 8, wherein each contact housing body has a central through bore and the optical contact is mounted at the forward end of the central through bore, one of the optical contacts comprises a multi-fiber female ferrule and the other optical contact comprises a multi-fiber male ferrule for mating engagement with the female ferrule in the mated condition, and a plurality of optical fibers extend from the respective ferrules through the central through bore of the respective contact housing body.

14. The apparatus of claim 13, wherein the plurality of optical fibers in each connector unit are configured as a respective ribbon fiber.

15. A connector apparatus, comprising:

a first connector unit having a rear end, a forward end, and a first contact housing body with a forward end face;

a second connector unit releasably mateable with the first connector unit and having a rear end, a forward end, and a second contact housing body with a forward end face;

one of the connector units having a cavity extending from the forward end and the other connector unit having a forward end portion which engages in the cavity in a mated condition of the units;

each contact housing body having at least one forwardly facing contact for communication with a respective at least one contact of the other contact housing body to form at least one contact junction in the mated condition;

an elastomeric seal assembly in the first connector unit having a through bore aligned with the at least one forwardly facing contact of the first connector unit;

the forward end face of each contact housing body having an annular projection which surrounds the at least one respective contact, the annular projection on the first contact housing body extending into an inner end of the through bore in the elastomeric seal assembly and being in sealing engagement with said through bore; and the first contact housing body having a first optical contact assembly having at least one forwardly facing optical contact and the second contact housing body having a second optical contact assembly having at least one forwardly facing optical contact for communication with the optical contact of the first optical contact assembly in the mated condition, the first contact housing body having a first through bore, the first optical contact assembly being movably mounted in the first through bore so as to move between an extended position when the connector units are unmated and a rearwardly retracted position in the mated condition of the connector units, a biasing device in the first through bore which biases the first optical contact assembly into the extended position, and at least one annular seal member is located between the first optical contact assembly and first through bore.

16. The apparatus of claim 15, wherein the annular seal member comprises a lip seal.

17. The apparatus of claim 16, further comprising a back-up seal member between the first optical contact assembly and first through bore.

18. The apparatus of claim 17, wherein the first through bore has a step in diameter forming a first stepped face and the optical contact assembly has a corresponding second stepped face which faces the first stepped face, the back-up seal member being located between the stepped faces of the first through bore and first optical contact assembly.

19. The apparatus of claim 18, wherein the stepped faces are of corresponding part-conical shape.

20. The apparatus of claim 18, wherein the back-up seal member is an O-ring face seal.

21. The apparatus of claim 18, wherein the lip seal is located between the first through bore and first optical contact assembly at a location spaced rearward from the stepped faces of the through bore and first optical contact assembly.

22. A connector apparatus, comprising:

a first connector unit having a forward end and a rear end;

a second connector unit having a forward end and a rear end and which is releasably mateable with the first connector unit;

each connector unit having a central through bore;

a first optical contact assembly movably mounted in the central through bore of the first connector unit and movable between an extended position in an unmated condition of the connector units and a retracted position in a mated condition of the connector units;

a second optical contact assembly secured in the central through bore of the second connector unit;

a biasing device in the central through bore of the first connector unit acting on the first optical contact assembly and biasing the first optical contact assembly into the extended position;

a first multi-fiber ferrule mounted at a forward end of the first optical contact assembly and a second multi-fiber ferrule mounted at a forward end of the second optical contact assembly for mating engagement with the first multi-fiber ferrule in the mated condition of the connector units;

a plurality of optical fibers extend from the respective ferrules through the central through bore of the respective connector unit;

one of the connector units having a recess extending inwardly from the forward end for receiving the forward end of the other connector unit in the mated condition of the connector units;

the connector units together forming a contact chamber surrounding the mated optical ferrules in the mated condition; and at least one seal member on one of the connector units which forms a seal between the connector units in the mated condition and which seals the optical contact chamber.

23. The apparatus of claim 22, wherein the seal member comprises an O-ring seal between the recess of said one connector unit and the forward end of said other connector unit in the mated condition of said connector units.

24. The apparatus of claim 23, further comprising a second O-ring seal between said connector units in the mated condition.

25. The apparatus of claim 22, wherein each connector unit has a plurality of electrical contacts arranged in a ring around the respective optical contact assembly which communicate with the electrical contacts in the other connector unit to form a series of electrical contact junctions in the mated condition of the connector units.

26. The apparatus of claim 25, further comprising a seal assembly in the first connector unit which forms a separate, individual sealed chamber around each electrical contact junction in the mated condition of the connector units.

27. The apparatus of claim 26, wherein the seal assembly comprises a single, ring-shaped elastomeric seal member having a central opening aligned with the optical contact assembly of the first connector unit, the seal member having a series of spaced openings extending through the ring-shaped region and aligned with respective electrical contacts to form said sealed chambers.

28. The apparatus of claim 26, wherein the seal assembly comprises a series of separate boot seals each engaged over a respective electrical contact of the first connector unit and receiving an aligned electrical contact of the second connector unit in the mated condition of the connector units.

29. The apparatus of claim 26, wherein each connector unit has a contact housing body with a forward face in which said electrical contacts are positioned, a plurality of first nipples projecting from the forward face of the contact housing body in the first connector unit, the seal assembly having a plurality of seal openings and each first nipple surrounding a base portion of a respective electrical contact and in sealing engagement with a respective seal opening of the elastomeric seal assembly.

30. The apparatus of claim 29, further comprising a plurality of second nipples projecting from the forward face of the contact housing body of the second connector unit, each second nipple surrounding a base portion of a respective electrical contact of the second connector unit and extending into sealing engagement with a respective seal opening of the elastomeric seal assembly in the mated condition of the connector units to form the individual sealed chamber around each electrical contact junction.

31. The apparatus of claim 30, wherein the elastomeric seal assembly comprises a single seal member having a plurality of through bores comprising said seal openings.

32. The apparatus of claim 31, wherein the seal member is ring-shaped with a central opening and the through bores are formed through the ring portion of the elastomeric seal.

33. The apparatus of claim 30, wherein the elastomeric seal assembly comprises a plurality of separate, sleeve-shaped seal members each in sealed engagement with a respective first nipple of the first connector unit and in sealed engagement with an aligned second nipple in the mated condition of the connector units.

34. The apparatus as claimed in claim 22, further comprising at least one annular seal member between the first optical contact assembly and central through bore.

35. The apparatus of claim 34, wherein the annular seal member comprises a lip seal.

36. The apparatus of claim 35, further comprising a back-up seal member between the first optical contact assembly and central through bore.

37. The apparatus of claim 36, wherein the central through bore of the first connector unit has a step in diameter forming a first stepped face which faces the forward end of the connector unit, and the first optical contact assembly has a step in diameter forming a second stepped face which faces said first stepped face, the back-up seal member being mounted on one of said stepped faces.

38. The apparatus of claim 37, wherein the stepped faces comprise matching part-conical faces.

39. The apparatus of claim 36, wherein the back up seal member is an O-ring seal.

40. A connector apparatus, comprising:

a first unit having a through bore and a first optical contact assembly movably mounted in the through bore for movement between an advanced and retracted position, the first optical contact assembly having a forward end face;

a second unit which is releasably mateable with the first unit, the second unit having a through bore and a second optical contact assembly mounted in the through bore and having a forward end face for face-to-face engagement with the forward end face of the first optical contact assembly when the units are in a mated condition;

the forward end face of each optical contact assembly having at least one optical contact for engagement with corresponding contact in the end face of the other optical contact assembly when the units are mated; and a biasing device mounted in the through bore in the first unit which biases the first optical contact assembly towards the advanced position;

a first seal member mounted between opposing portions of the first optical contact assembly and through bore and forming a sliding seal between the opposing portions as the first optical contact assembly moves between the advanced and retracted positions; and the through bore in the first unit having a step in diameter forming a first stepped face and the first optical contact assembly having an outer surface with a corresponding step in diameter forming a second stepped face which faces the first stepped face, a back-up face seal member mounted in one of the stepped faces and which provides a back-up seal on exposure of the first unit to external pressure in an unmated condition, and the stepped faces being spaced apart in normal operation of the connector apparatus;

whereby the face seal member comprises a back up seal which backs up the first seal member.

41. The apparatus as claimed in claim 40, wherein the stepped faces are part-conical faces.

42. The apparatus as claimed in claim 40, wherein the forward end face of each optical contact assembly has multiple optical contacts, and a plurality of optical fibers extend from the optical contacts through the respective optical contact assembly to the rear end of the respective connector unit.

43. The apparatus as claimed in claim 42, wherein the plurality of optical fibers in each optical contact assembly are configured as a ribbon fiber.

44. A connector apparatus, comprising:

a first connector unit having a rear end, a forward end, and a first contact housing body with a forward end face;

a second connector unit releasably mateable with the first connector unit and having a rear end, a forward end, and a second contact housing body with a forward end face;

one of the connector units having a cavity extending from the forward end and the other connector unit having a forward end portion which engages in the cavity in a mated condition of the units;

each contact housing body having a central optical contact assembly, and a plurality of electrical contacts projecting from the forward end face arranged in a ring around the optical contact assembly which engage with electrical contacts in the other contact housing body to form a plurality of electrical contact junctions in the mated condition; and an elastomeric seal assembly positioned between the contact housing bodies in the mated condition of the connector units, the seal assembly providing a separate, individual sealed chamber around each electrical contact junction in the mated condition of the connector units.

45. The apparatus of claim 44, wherein the elastomeric seal assembly has a plurality of bores defining said sealed chambers in the mated condition of the connector units, each electrical contact has a base portion adjacent the forward end face of the respective contact housing body, and each contact housing body has a plurality of nipples extending from the forward end face, each nipple extending around the base portion of the respective electrical contact and in sealed engagement with a respective bore in the seal assembly at least in the mated condition of the connector units.

46. The apparatus of claim 45, wherein the contact housing body of the first connector unit has a hollow projection from the forward end face which surrounds the optical contact assembly, and the seal assembly has a central opening engaged over the projection.

47. The apparatus of claim 44, wherein the elastomeric seal assembly comprises a single seal member having a plurality of through bores forming said sealed chambers.

48. The apparatus of claim 44, wherein the elastomeric seal assembly comprises a plurality of separate seal members each having a through bore forming a respective one of said sealed chambers.

49. The apparatus of claim 44, wherein the cavity extending from the forward end of one connector unit and the mating forward end portion of the other connector unit have mateable alignment formations which are positioned for alignment when the first and second connector units are positioned face to face with the respective contacts in the connector units aligned, the alignment formations being engaged in the mated condition of the connector units.

50. The apparatus of claim 49, wherein the cavity comprises a bore and the bore and forward end portion of the other connector unit are of mating circular cross-section, and the alignment formations comprise mating flats on the outer surface of the forward end portion and the inner surface of the bore.

51. The apparatus of claim 44, further comprising at least one external seal member between the cavity at the forward end of one connector unit and the forward end portion of the other connector unit in the mated condition of the connector units.

* * * * *